United States Patent
Francis

(10) Patent No.: US 8,744,079 B2
(45) Date of Patent: Jun. 3, 2014

(54) SECURE COMMUNICATION SYSTEM

(75) Inventor: Patrick Jonathan Francis, Newport (GB)

(73) Assignee: Cassidian Limited, Newport (GB)

( * ) Notice: Subject to any disclaimer, the term of this patent is extended or adjusted under 35 U.S.C. 154(b) by 63 days.

(21) Appl. No.: 13/496,053

(22) PCT Filed: Sep. 15, 2010

(86) PCT No.: PCT/GB2010/001737
§ 371 (c)(1),
(2), (4) Date: Jun. 5, 2012

(87) PCT Pub. No.: WO2011/033259
PCT Pub. Date: Mar. 24, 2011

(65) Prior Publication Data
US 2012/0243681 A1 Sep. 27, 2012

(30) Foreign Application Priority Data

Sep. 15, 2009 (GB) .................................. 0916182.9
Jun. 17, 2010 (GB) .................................. 1010166.5

(51) Int. Cl.
*H04L 9/32* (2006.01)
*H04L 9/00* (2006.01)
*H04L 9/08* (2006.01)
*H04L 9/30* (2006.01)

(52) U.S. Cl.
USPC .......................................... 380/44; 380/273

(58) Field of Classification Search
USPC .......................................... 380/277, 273, 44
See application file for complete search history.

(56) References Cited

U.S. PATENT DOCUMENTS 5,369,705 A 11/1994 Bird
7,082,200 B2 * 7/2006 Aboba et al. .................. 380/273

(Continued)

FOREIGN PATENT DOCUMENTS

WO 0233883 4/2002
WO 2008113950 A3 9/2008

OTHER PUBLICATIONS

T Hwang and J L Chen, "Identity-based conference key broadcast systems" IEEE Proc: Comput. Digit. Tech., vol. 141, No. 1, Jan. 1994, pp. 57-60.

(Continued)

*Primary Examiner* — Shin-Hon Chen
(74) *Attorney, Agent, or Firm* — Stout, Uxa, Buyan & Mullins; Carlos A. Fisher

(57) ABSTRACT

A method of encrypting data to be accessed only by a group of users comprises a user in the group receiving a user secret $s_i = f_1(R, u_i)$, the user secret having been created by operating a first one-way function $f_1$ on parameters comprising a root key R and a public identifier $u_i$ for the user. The user in the group receives a public identifier $u_i$ for each of the other users in the group. The user in the group obtains a group key by operating a second one-way function $f_2$ on parameters comprising the user secret s, and the public identifiers for the other users in the group $u_1, u_2, \ldots, u_{j-1}, u_{j+1} \ldots u_{n-1}, u_n$, wherein said second one-way function/band said first one-way function $f_1$ satisfy: $f_2(f_1(R,u_1), u_2, \ldots, u_n) = f_2(f_1(R,u_2), u_1, u_3, u_4 \ldots, u_n) = \ldots = f_2(f_1(R,u_n), u_1, u_2 \ldots, u_{n-1})$. The user in the group encrypts the data using the group key.

33 Claims, 1 Drawing Sheet

(56) References Cited

U.S. PATENT DOCUMENTS

2006/0191020 A1    8/2006   Miller
2011/0058668 A1*   3/2011   Yang et al. .................. 380/44

OTHER PUBLICATIONS

Chi-Sung Laih and Sung-Ming Yen, "On the design of conference key distribution systems for the broadcasting networks" Proceedings of the Annual Joint Conference of the Computer and Communications Societies (INFOCOM), Mar. 28-Apr. 1, 1993, published 1993, IEEE, pp. 1406-1413.

Shigeo Tsujii and Toshiya Itoh, "An ID-based cryptosystem based on the discrete logarithm problem" based on selected areas in communications, vol. 7, No. 4 May 1989.

Li Jian and Hu Lan-Ian, "Improved dynamic ID-based remote user authentication scheme using smart cards". Wireless Communications, Networking and Mobile Computing, 2008. WiCOM '08. 4th International Conference on Oct. 12-14, 2008.

Xiofeng Wang, Liang Cao, Shangping Wang and Yaling Zhang," ID-based convertible limited {multi-) verifier signature scheme", 2008 International Conference on Computer Science and Software Engineering, pp. 775-777.

Yong Yu, Bo Yang, Ying Sun, "A proverbly secure ID-based mediated signcrypton scheme", Eighth ACIS International Conference on Software Engineering, Artificial Intelligence, Networking and Parallel/Distributed Computing, pp. 647-652.

C.S. Laih, J.Y. Lee, "Modified ID-based cryptosystem using discrete logarithm problem". Electronics Letters, Jul. 7, 1988 vol. 24 No. 14.

S. Tsujii, t. Itoh, H Tnaka, "Comment-Modified ID-based cryptosystem using discrete logarithm problem". Electronics Letters, Jan. 5, 1989, vol. 25 No. 1.

S, Tsujii, T. Itoh, K Kurosawa "ID-based cryptosystem using discrete logarithm problem". Electronic Letters, Nov. 19, 1987, vol. 23 No. 24, pp. 1318-1320.

Tzong-Chen Wu, Yuh-Shing Chan, "Authorization-based group oriented secure broadcast system", Journal of Information Science and Engineering 15, pp. 653-667 (1999).

* cited by examiner

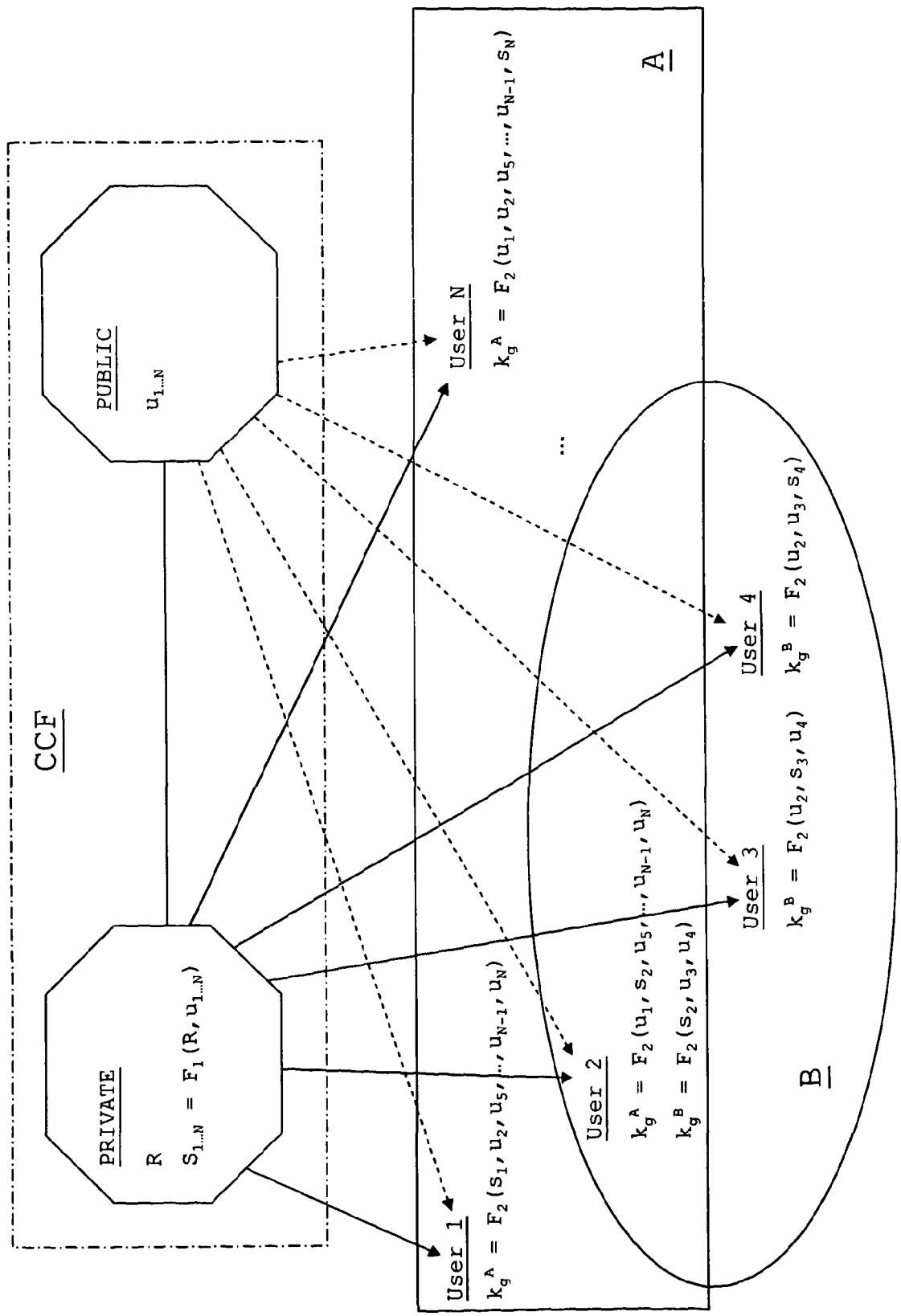

SECURE COMMUNICATION SYSTEM

FIELD OF THE INVENTION

This invention relates to the field of key generation for multi-party encryption. More particularly, it relates to key generation for multi-party encryption of data objects, including data, voice and other media encryption.

BACKGROUND ART

Currently, data is typically protected by encryption at the physical layer (e.g. by encrypting a point-to-point communications link, or an entire hard disk), or at the network layer through packet encryption (e.g. using IPSEC). However, that is generally not practical for protecting data of different security levels that need to be shared between different communities. A more flexible approach is to encrypt a data object (e.g. a word document, a paragraph within a document, or a token identifying a user, for example in a conferencing system) with an encryption key available only to those who have a right to access the object. The object can then be stored and transported without further encryption and objects of different security level can be placed on an open common server. The main problem in such a solution is deriving a key that is only available to a certain subset of users, and distributing that key.

In a conventional system, there is a central key management system and every time a group of users is assigned to an object, a key is generated, used to encrypt that object and distributed to all the users authorised to access it. Alternatively, each user establishes a secure channel and request the key if they need access to the object. The need to ensure that the keys are only provided to legitimate users gives rise to significant problems of key storage and user identity management and authentication.

A scheme has been propose by S. Tsujii and T Itoh (in "An ID-based crypto system based on the discrete logarithm problem", IEEE Journal on selected areas in communications, Vol. 7 No. 4, 1989, pp 467-473) that uses the discrete log problem (discussed further below). That scheme was then later extended by Tzong-Chen Wu and Yuh-Shihng Chan (in "Authorization-based Group-orientated Secure Broadcast System", Journal of Information Science and Engineering 15, pp 653-667 (1999) with the intention of adding "authorisation based" access control. However, neither of those schemes is particularly general in their approach, rather being limited to specific solutions. They also introduce unnecessary complexity and hence potential weaknesses. Other extensions to the Tsujii and Itoh scheme have been proposed and have been shown to be insecure (see C. S. Laih and J. Y. Lee, "Modified ID-based cryptosystem using discrete logarithm problem", Electronics Letters, 7 Jul. 1988, Vol. 24, pp 858-859, and S. Tsujii, T. Itoh, H. Tanaka, Toyko Inst. of Technology, "Modified ID-based cryptosystem using discrete logarithm problem (comment)", Electronic Letters, 5 Jan. 1989, Vol. 25, pp 77-78).

The use of one-way functions in key generation for encryption is well-known. Whilst no-one has proved the existence of functions that comply with the strict academic definition of a "one-way function", the person skilled in the field of key generation for encryption understands that a one-way function is a function that is easy to compute, but hard to invert (i.e., no methods of computing the inversions are known that are quick enough for the inversions to be possible on practical timescales). Several known families of functions are generally believed to be one-way, and are well-known amongst persons skilled in the art. As used herein, a "one-way function" is a function that would be considered by skilled persons in the encryption community to be effectively one-way, for practical purposes.

It would be advantageous to provide a method and system in which one or more of the aforementioned disadvantages is eliminated or at least reduced. It would be advantageous to eliminate or reduce the infrastructure and management needed to manage keys and related information in systems where data objects need to be encrypted and shared, reducing the cost of development, deployment and maintenance of such systems. It would also be advantageous to provide a method and system for establishing a common key for a multiparty communication on systems such as combat net radio, or voice conferences.

DISCLOSURE OF THE INVENTION

The invention is concerned with encryption of an object such that only a defined set of users (which may for example be individuals, departments or organisations) can decrypt it. The invention is also concerned with providing a method and system that is sufficiently flexible to cope when there is a need to change the membership of the group of users who can access the object. The need is therefore for a method of deriving a common cryptographic key, without the need to distribute the root key, while ensuring only the defined user group can decrypt the object.

A first aspect of the invention provides a method of encrypting data to be accessed only by a group of users, the method comprising a user in the group:

(a) receiving a user secret $s_i = f_1(R, u_i)$, the user secret having been created by operating a first one-way function $f_1$ on parameters comprising a root key R and a public identifier $u_i$ for the user;

(b) receiving a public identifier $u_j$ for each of the other users in the group;

(c) obtaining a group key by operating a second one-way function $f_2$ on parameters comprising the user secret $s_i$ and the public identifiers for the other users in the group $u_1, u_2, \ldots, u_{j-1}, u_{j+1}, \ldots u_{n-1}, u_n$, wherein said second one-way function $f_2$ and said first one-way function $f_1$ satisfy:

$$f_2(f_1(R,u_1),u_2,\ldots,u_n) = f_2(f_1(R,u_2),u_1,u_3, u_4\ldots,u_n) = \ldots = f_2(f_1(R,u_n),u_1,u_2,\ldots,u_{n-1}). \quad \text{[Eqn. 1]; and}$$

(d) encrypting the data using the group key.

The method may further comprise changing the composition of the group authorised to access the data, by carrying out steps (b) to (d) in respect of the users of the changed group; thus if users are added or removed to the group, a new group key is calculated using the public identifiers of the changed group, and the data re-encrypted using the new group key. The data may be encrypted by cryptographically translating from the old key to the new key.

The first and second one-way functions may be commutative, that is $$f_2(f_1(R,u_j),u_1,u_2,\ldots,u_{j-1},u_{j+1},\ldots,u_{n-1},u_n) = f_1(f_2(R,u_1,u_2,\ldots,u_{j-1},u_j,u_{j+1},\ldots,u_n)) j=1,2,\ldots n$$

A second aspect of the invention provides a method of decrypting data accessible only by a group of users, the method comprising a user in the group:

(a) receiving a user secret $s_i = f_1(R, u_i)$, the user secret having been created by operating a first one-way function $f_1$ on parameters comprising a root key R and a public identifier $u_i$ for the user;

(b) receiving a public identifier $u_j$ for each of the other users in the group;

(c) obtaining a group key by operating a second one-way function $f_2$ on parameters comprising the user secret $s_i$ and the public identifiers for the other users in the group $u_1$, $u_2, \ldots, u_{j-1}, u_{j+1}, \ldots u_{n-1}, u_n$, wherein said second one-way function $f_2$ and said first one-way function $f_1$ satisfy:

$$f_2(f_1(R,u_1),u_2,\ldots,u_n)=f_2(f_1(R,u_2),u_1,u_3,u_4\ldots,u_n)=\ldots=f_2(f_1(R,u_n),u_1,u_2,\ldots,u_{n-1}); \text{ and}$$

(d) decrypting the encrypted data using the group key.

Preferably, the root key is held at a remote central facility (that is, a remote distribution authority). The user secret may be created from the root key and the public identifier at the remote central facility.

The encrypted data may be tagged with the public user identities of the users of the group.

The parameters on which the first one-way function operates may include a parameter indicating a validity period for the user secret.

The parameters on which the second one-way function operates may include a random or pseudorandom element, which may for example be the time of day at which the operation is calculated. The parameters on which the second one-way function operates may include a parameter indicating a security clearance level for each user in the group of users.

The parameters on which the second one-way function operates may include parameters indicating the identities of a plurality of distribution authorities, each distribution authority having calculated the secret identities of a different portion of the users in the group.

The method may comprise the steps (i) receiving a second user secret, the second user secret having been created by operating the first one-way function on parameters comprising a second root key and a second public identifier for the user;

(ii) receiving a second public identifier for each of the other users in the group;

(iii) obtaining the group key by operating the second one-way function on parameters comprising the user secret and the second user secret and the public identifiers and the second public identifiers, for the other users in the group.

It may be that the user secret and the public identifier are received from a first distribution authority and the second user secret and the second public identifier are received from a second, different, distribution authority.

It may be that a third one-way function is used to calculate a derived user secret, by operation on the user secret and the second user secret, and that the group key is calculated by operating the second one-way function on parameters including the derived user secret. Clearly, in this case, the third one-way function must be substitutable for $f_1$ in Equation 1.

It may be that a fourth one-way function is used to calculate a derived user identity, by operation on the public user identity and the second public user identity, and that the group key is calculated by operating the second one-way function on parameters including the derived user identity. Clearly, in this case the fourth one way function must be substitutable for the "u"s in Equation 1.

A third aspect of the invention provides a method of distributing components for use in a method of encrypting or decrypting data accessible only by a group of users, the method comprising:

(a) creating a user secret $s_i=f_1(R, u_i)$ for each user in the group by operating a first one-way function $f_1$ on parameters comprising a root key R and a public identifier $u_i$ for the user, wherein said first one-way function $f_1$ and a second one-way function $f_2$ satisfy:

$$f_2(f_1(R,u_1),u_2,\ldots,u_n)=f_2(f_1(R,u_2),u_1,u_3,u_4\ldots,u_n)=\ldots=f_2(f_1(R,u_n),u_1,u_2,\ldots,u_{n-1});$$

(b) providing each user in the group with that user's own user secret.

The method may further comprise publishing the public identifiers for the users.

The method may further comprise providing the second one-way function to the users.

The method may further comprise publishing an identifier for the distribution authority that is carrying out the method. The method may, comprise informing users that there has been a security breach in the event of the distribution authority being compromised. The method may comprise repeating steps (a) and (b) in the event of the distribution authority being compromised.

Each user in the group may be provided with the user secret via a discrete data carrying object, e.g. a CD-ROM, DVD, USB stick, or, preferably, a cryptographic token (e.g. a smart card), which may be associated with a biometric reader. Alternatively, each user in the group may be provided with the user secret via a telecommunication link, which will preferably be equally or more secure than the security level of the encryption/decryption method in which the user secret is to be used.

The invention provides a protocol solution to the problem, without limitation to specific mathematical functions, other than to specify the properties of those functions. Thus, the one-way functions may be any one-way functions that satisfy Equation 1, wherein the finding of an inverse solution to the functions is sufficiently difficult to provide a desired level of security. Preferably, solution of the function is NP-hard. The one-way functions (i.e. the first and second, and the third and/or fourth functions, where relevant) used in the method of the invention may be identical. The one-way functions used in the method of the invention may belong to the same family of functions. The selection of suitable one-way functions is a straightforward task for the skilled person: first, one would identify a candidate one-way function, and then check that it satisfies Equation 1, either with itself as both the first and second one-way function, or with another, different, one-way function. Examples of suitable functions are functions the solving of which requires solution of the discrete log problem, i.e. functions that are members of the family of the form $F(A)=X^A \bmod N$, where X and N are large prime integers, carefully chosen in accordance with known principles as being suitable for use in a cryptographic scheme. Other example functions are functions based on elliptic curves.

The method may be a method of authenticating users, for example in a conference system (e.g. a voice or video conference system).

A fourth aspect of the invention provides a computer program product configured to perform the method of the first, second or third aspects of the invention.

A fifth aspect of the invention provides a communications system including apparatus adapted to perform the method of the first, second or third aspect of the invention.

BRIEF DESCRIPTION OF THE DRAWINGS

Example embodiments of the invention will now be described by way of example only and with reference to the accompanying drawings, of which:

FIG. 1 is a schematic illustration of components of an example communications system according to the invention.

DETAILED DESCRIPTION

In an example embodiment of the invention (FIG. 1), a distribution authority or Central Control Facility (CCF) holds a root key R, and publishes a public unique identity $u_i$ for each user. Users include individuals, but also in this example organisations and individual departments within the organisations. Thus each individual may have a number of identities $u_i$: a personal one, an organisational one, and a departmental one (the later two being shared with groups of other users, forming the organisation and the department, respectively).

In an initialisation phase, the CCF calculates a unique secret $s_i$ using one-way function $F_1$, where $s_i=F_1(R,u_i)$. The unique secret $s_i$ is distributed to users using available secure authentication channels (e.g. by providing each user with the unique secret $s_i$ in person on a physical medium such as a memory stick); again, each user may have a number of unique secrets, by virtue of having a number of identities.

In order to encrypt an object for storage or transmission, a user $u_i$ creates a list of the identities of the users that are to form a group g of users authorised to access the object. The creator then uses the one-way function $F_2$, which in this example is commutative with $F_1$, to form a group key $K_g$, for that specific group of users, where $K_g=F_2(s_i, u_1, \ldots, u_{i-1}, u_{i+1}, \ldots, u_n)$, function $F_2$ operating on the creator's secret $s_i$ and the public user identities of the other users in the group. The group key $K_g$ is used to encrypt the object using any of many encryption algorithms well-known in the art. The encrypted object is then tagged with the list of public user identities, including that of the creator, and stored.

To decrypt the encrypted object, any user whose identity is in the list tagged to the object creates the key $K_g$ in the same way, by applying $F_2$ to their own unique secret and the identities of all members of the group other than their own. As $F_1$ and $F_2$ satisfy Equation 1 above, the recalculated key will be the same value of $K_g$. $K_g$ can then be used as the key for decrypting the encrypted object.

If a new user is added to the group, a new key is required. The new key is created by adding the identity of the user to the list of identities tagged to the object, and using that list to create a new key. The object is then cryptographically translated from one key into the other.

If a user is removed from the group, then the identity of the user to be removed is removed from the list, a new key calculated, and the object cryptographically translated from the old key to the new key.

Inherent to the system is the requirement that the functions $F_1$ and $F_2$ be one-way. If $F_1$ were reversible then any user could derive R from their value of $s_i$. Similarly, $F_2$ must also be a one-way function, as described above. The value of R is secret and is known only to the central facility. The values $s_i$ are secret and each value is known only by the user to which it is assigned and only the central facility where they are calculated. The values $K_g$ are secret session keys and are known only to the group of users to which they relate. All other values are assumed to be public. There is a potential vulnerability to the system with some functions F (e.g. discrete log) should a user have access to two or more secrets derived from the same root key, as access to two or more $u_i$ values may allow calculation of the root key. For sensitive systems therefore, these $u_i$ values should be loaded onto cryptographic tokens (e.g. smart cards) at source and all key calculations should take place within the secure token.

The system as described will always generate the same session key for any specific group of users. In a practical system, that is not necessarily desirable. Therefore some random, or pseudo random element included as a parameter of $F_2$ when $K_g$ is being calculated. This would typically be time of day or another parameter attached to the object.

Table 1 sets out an example embodiment in which the functions $F_1$ and $F_2$ are implemented in a scheme based on the discrete log problem. The discrete log problem is well known, and is often used as the basis for the well known Diffie-Hellman key exchange protocol. The discrete log problem is based on functions of the form $F(A)=X^A \mod N$, where X and N are large prime integers, carefully chosen in accordance with known principles to be suitable for use in a cryptographic scheme. Such a function is regarded as being a "one-way function", as the task of exponentiation in modulo arithmetic is readily performed by a digital computer, but the inverse task (which involved the calculation of a discrete logarithm) is difficult.

Table 2 sets out a second example embodiment in which the functions $F_1$ and $F_2$ are implemented using elliptic curves. An elliptic curve is the set of solutions (x, y) to the equation of the form $y^2=x^3+ax+b$ or $y=(x^3+ax+b)^{1/2}$. It is widely accepted that not only is an elliptic curve a one way function but that its inverse becomes harder to compute against increasing length than the inverse function of a discrete logarithm.

In both examples, only a Central Control Facility (CCF) knows a Root Key R. A public unique identity $u_i$ is also held at the Facility, and the Facility uses that publicly known identity $u_i$, together with the secret Root Key R, and one-way function $F_1$, to calculate a unique secret $s_i=F_1(R,u_i)$. Using the discrete log problem as the one-way function, an example calculation of $s_i$ would take the form $s_i=X^{Ru_i} \mod N$ ($F_1$ may be considered to be a one-way function, based on the confidentiality of the Root Key R). Using elliptic curves as the one-way function, an example calculation of $s_i$ would take the form $s_i=(X^3+Ru_iX+Q)^{1/2} \mod N$, where Q is a public random component. Each $s_i$ is distributed to its intended user via an appropriate authenticated secure means.

When a number of users wish to form a specific group that can communicate between themselves in secret, then a Net Controller (e.g. one of the users) broadcasts a list of the public identities $u_i$ of every one of those individual group members requiring to communicate securely.

Each member of the group individually calculates a Group Key $K_g=F_2(s_i, u_1, \ldots, u_{i-1}, u_{i+1}, \ldots, u_n)$. Thus each user $u_i$ will calculate the key from all of the unique public identities of all of the group members, save for his own unique public identity. User $u_i$ will use his secret value $s_i$ and not his public value $u_i$. A one-way function $F_2$ will then yield the group key for, in this case, user i. Note that $u_i$ is not itself used on its own, but only embedded within the secret value $s_i$. In the discrete log example, $F_2$ takes the form $$K_g = F_2(Q, s_i, u_1, \ldots, u_{i-1}, u_{i+1}, \ldots, u_n) =$$
$$X^{Qs_i \prod_{i \neq j} u_j} \mod N = X^{QR \prod_i u_i} \mod N.$$

As $F_1$ and $F_2$ are commutative, it can be seen that $K_g=X^{R\prod u_i} \mod N$; consequently, all users in the group will calculate the identical value of $K_g$. A public random component Q may be incorporated in the computation of $K_g$ by including the component in the exponential for X, thus:

$$K_g = X^{s_i \prod_{i=j} u_j} \mod N.$$

In the elliptic curve example, $F_2$ takes the form:

$$K_g = F_2(s_i, u_1, \ldots, u_{i-1}, u_{i+1}, \ldots, u_n) =$$

$$\left(X^3 + s_i \prod_{i \ne j} u_j X + Q\right)^{1/2} \bmod N = \left(X^3 + R \prod u_i X + Q\right)^{1/2} \bmod N$$

again including the public random component Q. In this example $F_1$ and $F_2$ are also commutative, ensuring that all users in the group will calculate the identical value of $K_g$.

TABLE 1 parameters in Discrete Log Problem example

| Parameter | Generic Function | Example Discrete Log Form |
|---|---|---|
| Root Key | R | R |
| Public Unique Identity | $u_i$ | $u_i$ |
| Unique Secret | $s_i = F_1(R, u_i)$ | $s_i = X^{Ru_i} \bmod N$ |
| Group key | $K_g = F_2(s_i, u_1, \ldots, u_{i-1}, u_{i+1}, \ldots, u_n)$ | $K_g = X^{s_i \prod_{i \ne j} u_j} \bmod N$ $= X^{R \prod_j u_i} \bmod N$ |

TABLE 2 parameters in Elliptic Curves example

| Parameter | Generic Function | Example Elliptic Curve Form |
|---|---|---|
| Root Key | R | R |
| Public Unique Identity | $u_i$ | $u_i$ |
| Unique Secret | $s_i = F_1(R, u_i)$ | $s_i = (X^3 + Ru_i X + Q)^{1/2} \bmod N$ |
| Group key | $K_g = F_2(s_i, u_1, \ldots, u_{i-1}, u_{i+1}, \ldots, u_n)$ | $K_g = \left(X^3 + s_i \prod_{i \ne j} u_j X + Q\right)^{1/2} \bmod N$ $= (X^3 + R \prod u_i X + Q)^{1/2} \bmod N$ |

The proposed system also provides advantages in terms of ready authentication of users, in for example a voice conference system. In an example of such a system, the proposed method uses the identities ($u_i$) of all the users involved in the calculation of the group key $K_g$, and therefore possesses many of the beneficial features of Identity Based Encryption. Each user uses the identities of all other users in the overt form $u_i$, but uses their own identity bound along with R into their personal secret $s_i$. As R must be used in calculating the value of $K_g$ and is only available to the users bound to their identity in the form of $s_i$, a user can only derive a value of $K_g$ when their unique identity is used in the derivation of $K_g$. A user calculating a value $K_g$ can therefore be sure that the only users capable of calculating the same value are those users whose user identities $u_i$ have been included as parameters to $F_2$. Each user therefore possesses an implicitly authenticated list of user IDs of those users who may participate in that particular multi-party communication.

This concept is extended further by for example adding additional information to the value of $u_i$ over and above a simple user name. For example, $u_i$ could include a security clearance field and then while calculating $K_g$ a user could determine the security level of the communication from the clearance fields of the $u_i$ values used in the calculation of $K_g$. Other information that could be included could be an expiry date or crypto period for which could be used to determine the validity of an particular user's $s_i$. Again, a user cannot falsify that, because the value of $u_i$ is safely embedded within $s_i$. In essence therefore, the value $u_i$ can be regarded as a certificate containing user credentials, but that does not need to be signed.

In a shared data system, this approach removes the need for complex identity management, as possession of $u_i$ is necessary to gain access to the encrypted object. Secret identity $s_i$ must however be protected and only available to the designated user; for that reason, in this example $u_i$ is stored in a smart card token coupled with a biometric (e.g. fingerprint) reader. That provides protection for $s_i$ from the smart card and allow access only to the designated user through biometric authentication without the need for a large online identity management system.

The method makes possible use of a hierarchy for the distribution and management of user secrets $s_i$. In an example embodiment using such a hierarchy, the CCF prepares a secret value $a_j$ from the root key R and the identity of a Distribution authority $d_j$, using commutative one-way function $F_{1a}$ (i.e. $a_j = F_{1a}(R, d_j)$). The distribution Authority $d_i$ then prepares the user secrets $s_i$ for those users under its control using $F_{1b}$, where $s_i = F_{1b}(a_j, u_i)$. The value $K_g$ is then calculated using $F_2$ in exactly the same way as before, where the same distribution authority supplies all users in the group. However, where different distribution authorities serve different members of the group, the value $a_j$ for each $u_i$ used is included in the calculation of $K_g$ using $F_2$.

Again, because the functions used are one-way, it is not feasible to derive R from $a_j$. Therefore, if a distribution authority were compromised, only those users or subordinate distribution authorities would be compromised. Recovery from the compromise of a single entity, distribution authority or user is achieved by broadcasting the identity of the authority, or user to all authorities and users. This allows remaining users to operate securely until the $s_i$ and $a_i$ values of the directly and indirectly compromised entities can be replaced using new version of the user IDs $a_j$ and $u_i$ (possibly by changing a version field $a_j$ and $u_i$). Alternatively, the system can be re-initialised using a new root key R.

Because all keys are essentially derived form a secret root key and a number of public parameters, anybody possessing the root key is in a position to decrypt any message or object encrypted with a key derived using the method described. That can be viewed as a benefit if key escrow is required and the root key can be kept secure. In civilian networks however many users are unlikely to trust a single central agency with all their traffic. As with other ID based systems that have been proposed (e.g. CESG's IDPKC, see http://www.cesq.gov.uk/technology/id-pkc) it would be possible for two or more separate agencies to generate a $s_i$ value for each user based on independently generated root keys and different user parameters. When these two values $s_{i1}$ and $s_{i2}$ are distributed to the user, they would be combined using a one-way commutative function $F_3$ to derive an operation $s_i^*$, that is, if $s_{i1} = F_1(R_1, u_{i1})$ and $s_{i2} = F_1(R_2, u_{i2})$, then $s_i^* = F_3(s_{i1}, s_{i2})$.

In this case, when $K_g$ is calculated using $F_2$, the $u_i$ parameters in $F_2$ are replaced with $u_{i1}$ and $u_{i2}$ parameters. This approach both ensures that a single Root Key Agency cannot derive a traffic key and makes it more difficult to attack the root key: it is now necessary to obtain two root keys, and to achieve that, it is first necessary to reverse a one-way function ($F_2$) whose input parameters ($s_{i1}$, $s_{i2}$) are secret, and then reverse the one-way function ($F_1$) twice to obtain $R_1$ and $R_2$. Taking the discrete log problem and elliptic curves as example one-way functions, example embodiments employing two agencies will now be described (see also Table 3 and Table 4 below).

As discussed above, each agency supplies a secret $s_{i1}$ and $s_{i2}$ to each user, and each user has two corresponding IDs, $u_{i1}$ and $u_{i2}$. Therefore, when $K_g$ is calculated using $F_2$, the $u_i$ parameters in $F_2$ are replaced with the $u_{i1}$ and $u_{i2}$ parameters. This approach both (i) ensures that a single Root Key Agency cannot derive a traffic key, and (ii) makes it all the more difficult to attack the root key, as discussed above.

In the discrete log example, the process of the simple addition of partial Root Keys of two (or more) exponents can readily provide the complete Root Key, by the use of a function as in $F_3$. Secret parameters ($s_{i1}$ and $s_{i2}$) may be defined:

$$s_{i1} = X^{R_1 u_{i1}} \bmod N$$

$$s_{i2} = X^{R_2 u_{i2}} \bmod N$$

and $s_{i1}$ and $s_{i2}$ may be combined on receipt by the user to form a combined user secret $s_i^* = F_3(s_{i1}, s_{i2})$. After that calculation, $s_{i1}$ and $s_{i2}$ may be destroyed.

User identities issued by the multiple Key Facilities are similarly combined:

$$u_i^* = X^{u_{i1} u_{i2}} \bmod N$$

and the Group Key is then computed:

$$k_g^* = X^{s_i^* \prod_{i \neq j} u_j^*} \bmod N$$

$$= X^{s_{i1} s_{i2} \prod_{i \neq j} u_{j1} u_{j2}} \bmod N$$

$$= X^{(s_{i2} \prod_{i \neq j} u_{j2})(s_{i1} \prod_{i \neq j} u_{j1})} \bmod N$$

$$= X^{R_1 R_2 \prod u_{i1} \prod u_{i2}} \bmod N$$

Note that there will be a R* which is the effective Root Key, but no single Central Key Facility will be able to determine it, except by reversing $F_3$.

In the example using elliptic curves, the simple multiplication of partial Root Keys readily provides the complete Root Key, by the use of a function as in $F_4$. Secret parameters ($s_{i1}$ and $s_{i2}$) may be defined:

$$s_{i1} = (X^3 + R_1 u_{i1} X + Q)^{1/2} \bmod N$$

$$s_{i2} = (X^3 + R_1 u_{i2} + Q)^{1/2} \bmod N$$

As in the discrete log example, and $s_{i1}$ and $s_{i2}$ may be combined on receipt by the user to form $s_i^*$ and then destroyed.

User identities issued by the multiple Key Facilities can similarly be combined:

$$u_i^* = (X^3 + u_{i1} u_{i2} X + Q)^{1/2} \bmod N$$

and the Group Key is then computed:

$$k_g^* = \left(X^3 + s_i^* \prod_{i \neq j} u_j^* X + Q\right)^{1/2} \bmod N =$$

$$\left(X^3 + s_{i1} s_{i2} \prod_{i \neq j} u_{j1} u_{j2} X + Q\right)^{1/2} \bmod N$$

As in the discrete log example, there will be a R* which is the effective Root Key, but no single Central Key Facility will be able to determine it, except by reversing $F_4$.

TABLE 3

| parameters in DLP example with two Key Agencies | | |
|---|---|---|
| Parameter | Generic Function | Example Discrete Log Form |
| $1^{st}$ Root Key | $R_1$ | $R_1$ |
| $2^{nd}$ Root Key | $R_2$ | $R_2$ |
| $1^{st}$ Public Unique Identity | $u_{i1}$ | $u_{i1}$ |
| $2^{nd}$ Public Unique Identity | $u_{i2}$ | $u_{i2}$ |
| Combined Public Unique Identity | $u_i^* = F_3(u_{i1}, u_{i2})$ | $u_i^* = X^{u_{i1} u_{i2}} \bmod N$ |
| $1^{st}$ Unique Secret | $s_{i1} = F_1(R_1, u_{i1})$ | $s_{i1} = X^{R_1 u_{i1}} \bmod N$ |
| $2^{nd}$ Unique Secret | $s_{i2} = F_1(R_2, u_{i2})$ | $s_{i2} = X^{R_2 u_{i2}} \bmod N$ |
| Combined Unique Secret | $s_i^* = F_3(s_{i1}, s_{i2})$ | $s_i^* = X^{s_{i1} s_{i2}} \bmod N$ |
| Combined Group key | $k_g^* = F_2(s_i^*, u_1^*, \ldots, u_{i-1}^*, u_{i+1}^*, \ldots, u_n^*)$ | $k_g^* = X^{s_i^* \prod_{i \neq j} u_j^*} \bmod N$ $= X^{s_{i1} s_{i2} \prod_{i \neq j} u_{j1} u_{j2}} \bmod N$ $= X^{(s_{i2} \prod_{i \neq j} u_{j2})(s_{i1} \prod_{i \neq j} u_{j1})} \bmod N$ $= X^{R_1 R_2 \prod_i u_{i1} \prod_i u_{i2}} \bmod N$ |

TABLE 4 parameters in DLP example with two Key Agencies

| Parameter | Generic Function | Example Elliptic Curve Form |
|---|---|---|
| Parameter | Generic Function | Example Discrete Log Form |
| $1^{st}$ Root Key | $R_1$ | $R_1$ |
| $2^{nd}$ Root Key | $R_2$ | $R_2$ |
| $1^{st}$ Public Unique Identity | $u_{i1}$ | $u_{i1}$ |
| $2^{nd}$ Public Unique Identity | $u_{i2}$ | $u_{i2}$ |
| Combined Public Unique Identity | $u_i^* = F_4(u_{i1}, u_{i2})$ | $u_i^* = (X^3 + u_{i1}u_{i2}X + Q)^{1/2} \bmod N$ |
| $1^{st}$ Unique Secret | $s_{i1} = F_1(R_1, u_{i1})$ | $s_{i1} = (X^3 + R_1 u_{i1} X + Q)^{1/2} \bmod N$ |
| $2^{nd}$ Unique Secret | $s_{i2} = F_1(R_2, u_{i2})$ | $s_{i2} = (X^3 + R_1 u_{i2} X + Q)^{1/2} \bmod N$ |
| Combined Unique Secret | $s_i^* = F_4(s_{i1}, s_{i2})$ | $s_i^* = (X^3 s_{i1} s_{i2} X + Q)^{1/2} \bmod N$ |
| Combined Group key | $k_g^* = F_2(s_i^*, u_1^*, \ldots, u_{i-1}^*, u_{i+1}^*, \ldots, u_n^*)$ | $k_g^* = \left(X^3 + s_i^* \prod_{i \neq j} u_j^* X + Q\right)^{1/2} \bmod N$ $= \left(X^3 + s_{i1} s_{i2} \prod_{i \neq j} u_{j1} u_{j2} X + Q\right)^{1/2} \bmod N$ |

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may be absent in other embodiments.

The invention claimed is:

1. A computer-implemented method of rendering data transmitted via a communications system accessible solely to a predefined group of users of the communications system, comprising:
    a) making available solely to each user of said group
        i) a user secret $s_i$, wherein $s_i$ equals $f_1(R, ui)$, and $f_1$ is a first one-way function operating on a root key R and a unique public identifier for that user (ui); and
        ii) a public identifier (uj) for each other user in said group;
    b) wherein a deriving user, employing a computer,
        i) derives a group key by operating a second one-way function ($f_2$) on parameters comprising:
            a) the deriving user's secret $s_i$; and
            b) the public identifier(s) for each of said one or more other user of said group ($u_1, u_2, \ldots u_{j-1}, u_{j+1}, \ldots, u_{n-1}, u_n$);
        $f_2$ being selected so that:

$f_2(f_1(R,u_1),u_2,\ldots,u_n) = f_2(f_1(R,u_2),u_1,u_3, u_4\ldots,u_n) = \ldots = f_2(f_1(R,u_n),u_1,u_2,u_4\ldots,u_n-1);$ and
        ii) encrypts said data using the group key as input to an encryption algorithm; and
    c) transferring said encrypted data to each other user in said group via said communications system.

2. A method as claimed in claim 1, further comprising changing the composition of the group authorized to access the data, by carrying out steps (b) to (d) in respect of the users of the changed group.

3. A method as claimed in claim 1, in which the root key is held at a remote central facility.

4. A method as claimed in claim 1, in which the encrypted data is tagged with the public user identities of the users of the group.

5. A method as claimed in claim 1, in which the parameters on which the first one-way function operates include a parameter indicating a validity period for the user secret.

6. A method as claimed in claim 1, in which the parameters on which the second one-way function operates include a random or pseudorandom element.

7. A method as claimed in claim 1, in which the parameters on which the second one-way function operates include parameters indicating the identities of a plurality of distribution authorities, each distribution authority having calculated the secret identities of a different portion of the users in the group.

8. A method as claimed in claim 1, comprising the steps:
    (i) receiving a second user secret, the second user secret having been created by operating the first one-way function on parameters comprising a second root key and a second public identifier for the user;
    (ii) receiving a second public identifier for each of the other users in the group;
    (iii) obtaining the group key by operating the second one-way function on parameters comprising the user secret and the second user secret and the public identifiers and the second public identifiers, for the other users in the group.

9. A method as claimed in claim 8, in which the user secret and the public identifier are received from a first distribution authority and the second user secret and the second public identifier are received from a second, different, distribution authority.

10. A method as claimed in claim 8, in which a third one-way function is used to calculate a derived user secret, by operation on the user secret and the second user secret, and that the group key is calculated by operating the second one-way function on parameters including the derived user secret.

11. A method as claimed in claim 10, in which a fourth one-way function is used to calculate a derived user identity, by operation on the public user identity and the second public user identity, and that the group key is calculated by operating the second one-way function on parameters including the derived user identity.

12. A method as claimed in claim 1, in which each user in the group is provided with the user secret via a discrete data carrying object comprising one of: CD-ROM, DVD, USB stick, or a cryptographic token.

13. A method as claimed in claim 1, in which the one-way functions are commutative one-way function.

14. A method as claimed in claim 13, in which solution of the functions is NP-hard.

15. A method as claimed in claim 1, in which the method is a method of authenticating users.

16. A computer program product configured to perform the method in claim 1.

17. A communications system including apparatus adapted to perform the method in claim 1.

18. A computer-implemented method of decrypting data accessible only by a predefined group of users, the method comprising making available solely to a user of said group who has received encrypted data via a communications system from another user of said group:
  (a) a user secret $s_i = f_1(R, u_i)$, the user secret having been created by operating a first one-way function $f_1$ on parameters comprising a root key R and a public identifier $u_i$ for the user;
  (b) a public identifier $u_j$ for each of the other users in the group;
  (c) wherein a decrypting user, employing a computer, derives a group key by operating a second one-way function $f_2$ on parameters comprising the decrypting user's secret $s_i$ and the public identifiers for the other users in the group $u_1, u_2, \ldots, u_{j-1}, u_{j+1} \ldots u_{n-1}, u_n$, wherein said second one-way function $f_2$ and said first one-way function $f_1$ satisfy:

$$f_2(f_1(R,u_1)u_2,\ldots,u_n) = f_2(f_1(R,u_2),u_1,u_3,u_4\ldots,u_n) = \ldots = f_2(f_1(R,u_n),u_1 u_2,\ldots,u_{n-1}); \text{ and}$$

and decrypts the encrypted data using the group key as input to a decription algorithm.

19. A method as claimed in claim 18, in which the root key is held at a remote central facility.

20. A method as claimed in claim 18, in which the encrypted data is tagged with the public user identities of the users of the group.

21. A method as claimed in claim 18, in which the parameters on which the first one-way function operates include a parameter indicating a validity period for the user secret.

22. A method as claimed in claim 18, in which the parameters on which the second one-way function operates include a random or pseudorandom element.

23. A method as claimed in claim 18, in which the parameters on which the second one-way function operates include parameters indicating the identities of a plurality of distribution authorities, each distribution authority having calculated the secret identities of a different portion of the users in the group.

24. A method as claimed in claim 18, comprising the steps
  (iv) receiving a second user secret, the second user secret having been created by operating the first one-way function on parameters comprising a second root key and a second public identifier for the user;
  (v) receiving a second public identifier for each of the other users in the group;
  (vi) obtaining the group key by operating the second one-way function on parameters comprising the user secret and the second user secret and the public identifiers and the second public identifiers, for the other users in the group.

25. A method as claimed in claim 24, in which the user secret and the public identifier are received from a first distribution authority and the second user secret and the second public identifier are received from a second, different, distribution authority.

26. A method as claimed in claim 24, in which a third one-way function is used to calculate a derived user secret, by operation on the user secret and the second user secret, and that the group key is calculated by operating the second one-way function on parameters including the derived user secret.

27. A method as claimed in claim 26, in which a fourth one-way function is used to calculate a derived user identity, by operation on the public user identity and the second public user identity, and that the group key is calculated by operating the second one-way function on parameters including the derived user identity.

28. A method as claimed in claim 18, in which each user in the group is provided with the user secret via a discrete data carrying object comprising one of: CD-ROM, DVD, USB stick, or a cryptographic token.

29. A method as claimed in claim 18, in which the one-way functions are commutative one-way functions.

30. A method as claimed in claim 29, in which solution of the functions is NP-hard.

31. A method as claimed in claim 18, in which the method is a method of authenticating users.

32. A computer program product configured to perform the method in claim 18.

33. A communications system including apparatus adapted to perform the method in claim 18.

* * * * *